United States Patent [19]

Baker et al.

[11] Patent Number: 4,892,471
[45] Date of Patent: Jan. 9, 1990

[54] STEAM VENTING EXTRUDER FEEDER

[75] Inventors: John E. Baker, Farmers Branch; Ramon Cantu, Dallas, both of Tex.

[73] Assignee: Frito-Lay, Inc., Dallas, Tex.

[21] Appl. No.: 249,344

[22] Filed: Sep. 23, 1988

[51] Int. Cl.[4] .................. B29C 31/10; B29C 47/00
[52] U.S. Cl. ...................... 425/132; 55/189; 264/349; 425/200; 425/203; 425/546; 425/584; 366/76; 366/163
[58] Field of Search ............... 425/203, 200, 132, 546, 425/584, 585, 578; 55/486, 189, 55; 264/349; 366/76, 150, 163

[56] References Cited

U.S. PATENT DOCUMENTS

| | | | |
|---|---|---|---|
| 1,183,397 | 6/1916 | Newcomb | 55/468 |
| 3,157,107 | 11/1964 | Kosar | 55/468 |
| 3,879,155 | 4/1975 | Hendry | 425/4 C |
| 3,985,348 | 10/1976 | Skidmore | 425/203 |
| 4,110,844 | 8/1978 | Nakamura | 366/76 |
| 4,185,547 | 1/1980 | Nakazato et al. | 99/453 |
| 4,632,564 | 12/1986 | Kopernicky | 366/75 |
| 4,636,084 | 1/1987 | Kopernicky | 366/76 |
| 4,636,085 | 1/1987 | Kopernicky | 366/76 |
| 4,642,241 | 2/1987 | Noguchi | 426/634 |

FOREIGN PATENT DOCUMENTS 61-277421 12/1986 Japan ......................... 425/203
2149637A 6/1985 United Kingdom .

OTHER PUBLICATIONS

Baker Perkins MPF-50D Twin Screw Multi-Purpose Food Extrusion System-Operating Instructions.
Twin Screw Extrusion Technology—Werner & Pfleiderer Corporation.

Primary Examiner—Jay H. Woo
Assistant Examiner—K. P. Nguyen
Attorney, Agent, or Firm—Bernard, Rothwell & Brown

[57] ABSTRACT

A steam venting extruder feeder is provided for gravity feeding of flowable solid materials into a food extruder downstream of the first normal first zone feed port. The steam venting extruder feeder feeds the material down a tube while simultaneously venting steam from within the extruder around the periphery of the feed tube inside an outer tube in which compressed air is forced to assist in the flow of steam and pulls air in with the feed material preventing steam condensation and build-up in the feed tube.

5 Claims, 2 Drawing Sheets

STEAM VENTING EXTRUDER FEEDER

BACKGROUND OF THE INVENTION

1. Field of the Invention

This invention relates to improvements in feeders for food extruders and particularly to a feeder for gravity feeding of flowable solids to an extruder while venting steam generated in the extrudate during the process of extrusion.

2. BACKGROUND ART

It is well known in the art to extrude various food products, particularly snack food products utilizing an auger or screw extruder which mixes and compresses materials and extrudes them through a die. In doing so the extrudate gets quite hot and there is considerable steam generated within the extruded materials. Examples of such well known commercially available food extruders are the Baker & Perkins MPF-50D sold by Baker Perkins of Saginaw, Mich. or twin screw extruders sold by Werner & Pfleiderer Corp. of Ramsey, N.J.

It is highly desirable to gravity feed divided solid material to the food extrudate within the extruder for various purposes. For example, in certain cases it is desirable to add divided solid materials, e.g., particulates such as grains or powder, to an extruder just prior to the extrudate exiting from the die. However, attempts to feed such materials through an open port or through known feeders result in the steam which is generated within the extruder condensing on the feeder walls and causing eventual build-up or blockage. Thus, there is need in the art for a feeder for a food extruder which could feed solid materials by gravity and eliminate the problem of blockage and build-up caused by venting steam.

While it is known in the art to feed flavor-determining components into a food extruder downstream of the main ingredient inlet (see feed device 8 in U.K. Patent Application G.B. No. 2149637 A), and it is known to vent steam from a downstream port in an extruder (see vent 20 in U.S. Pat. No. 4,642,241), as well as to remove volatiles such as steam in injection molding plastic extruders (see U.S. Pat. No. 4,636,084), no solution was known to the vexing problem of gravity feeding of solid materials into a food extruder of the type wherein steam generated within the extruder could cause build-up and blockage on the feeder walls.

SUMMARY OF THE INVENTION

This invention provides an extruder feeder apparatus in combination with a multi-stage extrusion process for food products in which the adding of solid materials takes place in a feed tube downstream of the infeed to the extruder and in which the temperature of the extrudate is such that at the point of adding the solid materials steam is generated from moisture in the extrudate. The invention resides in the improvements of adding the solid materials via gravity feed through a feed tube, and venting the steam around the periphery of the feed tube by forcing compressed gas into the confined annular space around the periphery of the feed tube to assist in both venting the steam and gently causing the gravity-fed solid materials to flow into the extruder. More particularly, the feed tube has an outer tube surrounding it for exhausting steam through the annular space between the two tubes, and means are provided for introducing compressed gas to assist in the venting and to cause flow of the material down through the feed tube.

DETAILED DESCRIPTION OF THE PREFERRED EMBODIMENT

Figure 1:
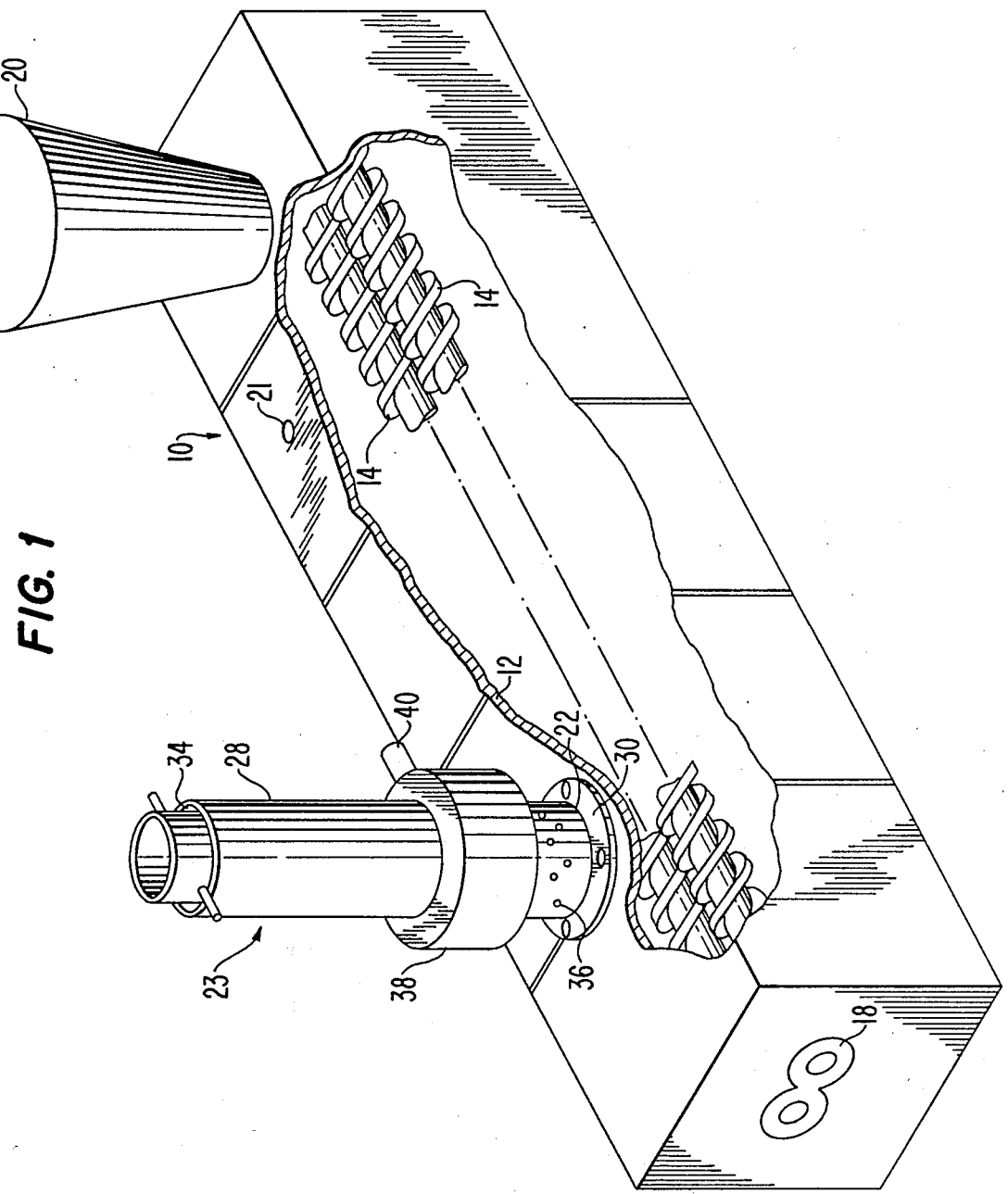
FIG. 1 is a perspective simplified view of an extruder (with certain wall portions broken away) showing the present steam venting extruder feeder applied thereto.

A multi-stage extruder 10 has an extruder wall 12 and contains twin screws 14 which are driven by a motor (not shown) to extrude extrudate through an opening 18 as is conventional in the art. Various types of dies may be attached at this opening to control the shape of the extruded materials. A mix of food material is fed into the extruder through an initial feed port or inlet 20 by conventional means, not shown, and is mixed, compressed, and heated during its passage towards the opening 18. Water may be added, optionally, at a water feed inlet 21 to adjust the moisture level of the extruded mixture.

Figure 2:
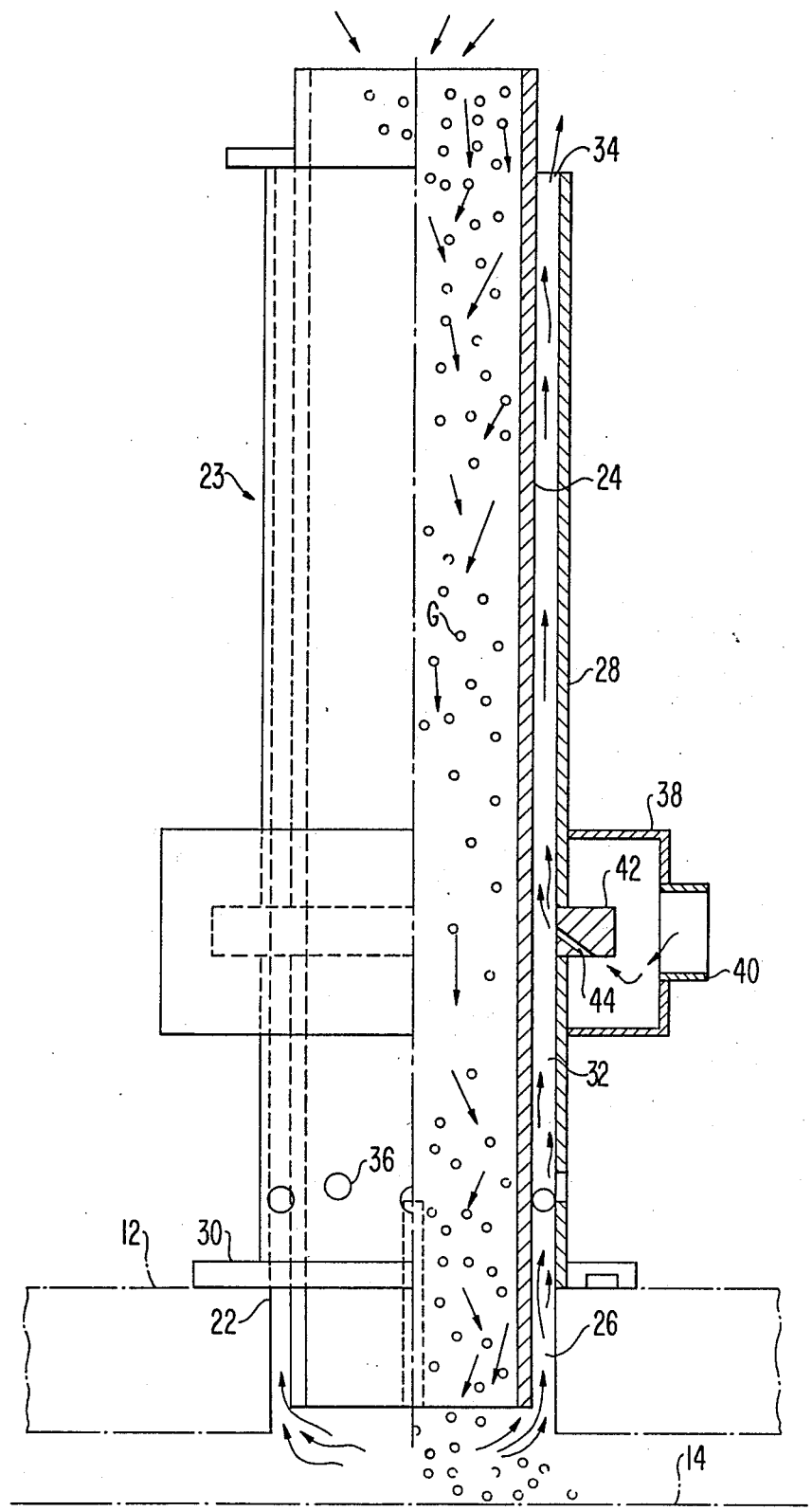
FIG. 2 is an elevation view partially in section showing the steam venting extruder feeder of this invention.

The extruder may be provided with further feed inlets such as port 22 passing through extruder wall 12, see FIG. 2, so that additional material may be fed by gravity through feeder 23 into the extrudate. Such additional material may be powdered or granular material, which tends to agglomerate when moist, or any other solid material which flows by gravity. In one case granular material is fed into the extrudate just prior to passing through opening 18 so as to keep the granular material as visible as possible in the end product. In the area of port 22 the extrudate is quite hot, usually so hot that considerable steam is present and such steam passes out of opening 22.

In this invention an inner feed tube 24 for feeding solid materials G has its inner end extending within the opening 22 while leaving an annular space 26 therebetween.

An outer tube 28 is affixed to the extruder wall by a holding ring 30 so that the interior of the tube 28 is flush with the opening 22 and an annular passage 32 is provided between the inside of outer tube 28 and the outside of inner feed tube 24. This annular passage 32 opens at its lower end into space 26 and communicates with the extruder above the screws, and vents to atmosphere at its upper end 34.

A series of vent holes 36 are provided around the periphery of the outer tube 28 adjacent the exterior extruder wall 12. A compressed air chamber 38 surrounds the outer tube and has an inlet 40 for the introduction of compressed air from a suitable source (not shown). The compressed air is preferably at 350–1050 gm./sq.cm. pressure (5–15 psi). An air-directing ring 42 having a plurality of small holes 44 directs compressed air into the annular space 32 and upwardly as viewed in FIG. 2. The ring 42 is mounted at approximately one-third the height of the outer tube 28.

In operation, as the compressed air moves through openings 44 (in one example eight (1/16") holes spaced equally around the ring) in an upward direction it pulls with it ambient air through vent holes 36 (with, e.g., 12 circumferentially spaced 6.4 mm. (¼") diameter holes) and steam from the extruder through annular space 26. This air and steam exhausts at the upper opening 34. Fresh air is also pulled down the center of feed tube 24 and incorporated into the airflow around the outside of inner tube 24.

This arrangement flushes steam from inside the extruder chamber while at the same time providing a positive airflow down the feed tube 24 to assist the downward flow of the feed material. Thus, the stream of air introduced through compressed air inlet 40 and passing through small radial holes 44 assists in pulling the steam from within the extruder and keeping it from entering the feed tube 24 while at the same time an actual down-draft or gentle suction of air down the feed tube 24 is produced which aids in feeding materials into the hot extrudate materials inside the extruder.

The following is a non-limiting example of the use of the steam venting feeder.

Dry ingredients were weighed out and premixed in a paddle mixer until uniform:
Rice flour (Riviana)—50 lbs.–77.0%
Soy fiber (Ralston)—13 lbs.–20.0%
Yeast flavor (Fidco)—1.3 lbs.–2.0%
Salt (Morton)—0.65 lbs.–1.0%

50 pounds of whole wheat were added to boiling water in a steam-jacketed kettle and 12 pounds of whole oat groats were added 6 minutes later. The kettle was emptied into a strainer 2 minutes later resulting in a 2 min. cook for the oats and an 8 min. cook for the wheat. The grains were rinsed cool (35–55° C.) with ambient cold tap water and were drained for one hour prior to using.

A Baker-Perkins Model BP-50 Extruder was set up with a screw configuration known by the inventors as "JB-F" which provides for five zones or areas of different function:
Zone 1—Feed section.
Zone 2—Low shear or work.
Zone 3—Medium shear or work.
Zone 4—High shear or work.
Zone 5—Convey only (very low shear or work).

The first feed port 20 (for the dry mix) was positioned at the feed section and the second (last) feed port 23 (for the grains) was positioned just after zone 4 and at the start of zone 5. The first feeder 20 is the typical funnel- or hopper-shaped open feeder whereas the second feeder 23 is the special steam venting feeder described by this invention. The die on the opening 18 of the extruder was a ribbon die approximately 40 cm. (4-inches) wide with a slit opening of 30-38 mm. This allowed the whole grains to remain somewhat intact and kept the die orifice from clogging and the ribbon from splitting. After exiting the extruder, final ribbon thickness adjustment (6–7 mm.) was made with the drum dryer (not shown) used as a sheeter to reduce the ribbon thickness.

The five temperature zones in the extruder were set at 43°, 82°, 88°, 93° and 99° Celsius, respectively, in the direction of product flow (i.e. zones 1 thru 5). The speed of the extruder screws 14 was set at 250 rpm.

The process was started by preheating the extruder to the specified temperatures, starting the auger turning and starting some of the water addition into the extruder barrel at water feed inlet 21. Air was introduced at inlet 40 to prevent any steam from entering into the feed tube 24. Air pressure was adjusted to 700 gm./sq.cm. (10 psig). This is usually maintained within a range of 350-1050 gm./sq.cm. (5-15 psig). The dry mix was then introduced into inlet 20 at a small portion of its intended rate, and both the dry mix and the water rates wee increased gradually until they were at the desired dry mix feed rate of 380 gms./min. and water feed rate of 165 gms./min. The extrusion was allowed to continue until the ribbon exiting the die had achieved a steady state before the grain feed was introduced into feed tube 24 at a rate of approximately 80 gms./min. The extruded ribbon containing the whole grains was then sheeted to a 6.8 mm. (0.027") thickness using the drum dryer.

The steam generated was successfully vented through the steam venting feeder 23 and there was no clogging or agglomeration of the materials fed into the extruder through inlet 22 of feeder 23.

It is found in practice that the steam venting feeder of this invention eliminates steam condensation on the feeder walls and consequent build-up and blockage of the feed material by constantly flushing steam up and out a separate path and keeping the steam away from the flowable solids being added by gravity to the extrusion mixture.

What is claimed is:

1. An extruder feeder apparatus for feeding moisture-containing solid materials into a downstream port of a food extruder for preparing an extrudate in which the extrudate at the downstream port has a temperature such that steam is generated in the extrudate and such steam hinders solid material feeding, the feeder apparatus comprising:
   (a) a feed tube for feeding solid materials into the extruder through an extruder wall opening;
   (b) means defining a steam exit passage through the extruder wall opening and surrounding the feed tube, said means including vent openings allowing ambient, untreated air to enter the steam exit passage; and
   (c) means for pressure assisting the venting of the steam from the extruder and the feed of solid materials within the feed tube, said means for pressure assisting comprising a compressed air chamber which surrounds the outer tube and comprises
      (i) an inlet for the introduction of compressed air into a housing of the compressed air chamber, and
      (ii) an air directing ring disposed within the housing and comprising a restricted passageway for directing the compressed air into the steam exit passage,
whereby compressed air injected into the steam exit passage induces (1) ambient, untreated air to enter the steam exit passage through the vent holes, (2) ambient, untreated air to enter the feed tube and assist in the downward flow of the solid materials and (3) steam generated in the extruder to be vented out of the apparatus through the steam exit passage.

2. An extruder feeder apparatus as defined in claim 1 wherein the vent holes are disposed in the means defining a steam exit passage between the extruder wall and the compressed air chamber for allowing ambient, untreated air to enter the steam exit passage.

3. An extruder feeder apparatus for feeding moisture-containing solid materials into a downstream port of a food extruder for preparing an extruder in which the extrudate at the downstream port has a temperature such that steam is generated in the extrudate and such steam hinders solid material feeding, the feeder apparatus comprising:
   (a) a feed tube for feeding solid materials into the extruder through an extruder wall opening;

(b) means defining a steam exit passage through the extruder wall opening and surrounding the feed tube; and
(c) means for pressure assisting the venting of the steam from the extruder and the feed of solid materials within the feed tube, said means for pressure assisting comprising means for forcing gas under pressure into the steam exit passage surrounding the feed tube;
(d) an outer tube having one end sealed against the extruder wall opening and an inner surface spaced from the feed tube to provide the steam exit passage; and
(e) an exhaust opening adjacent the other end of the tube, wherein the means for forcing gas under pressure comprises a compressed air chamber surrounding the outer tube for receiving compressed air, a restricted passageway leading from the compressed air chamber to the steam exit passage and directed away from the extruder wall to pull steam and air out of the passage in an upward direction, and a plurality of inlet air orifices in the outer tube between the extruder wall and the chamber.

4. An extruder feeder apparatus as defined in claim 3 wherein the feed tube, outer tube, and compressed air chamber are circular in section.

5. An extruder feeder apparatus as defined in claim 3 wherein the feed tube has its inner end opened and positioned inside the outer extruder wall but outside the periphery of an auger in the extruder.

* * * * *